March 17, 1964 | T. A. JEEVES | 3,125,675

COMPUTER CARRY CIRCUITS

Filed Nov. 21, 1961 | 5 Sheets-Sheet 1

WITNESSES

Leon J. Taza

James H. Young

INVENTOR

Terry A. Jeeves

BY M. J. Brodahl

ATTORNEY

March 17, 1964 T. A. JEEVES 3,125,675

COMPUTER CARRY CIRCUITS

Filed Nov. 21, 1961 5 Sheets-Sheet 2

March 17, 1964 T. A. JEEVES 3,125,675

COMPUTER CARRY CIRCUITS

Filed Nov. 21, 1961 5 Sheets-Sheet 3

March 17, 1964 T. A. JEEVES 3,125,675

COMPUTER CARRY CIRCUITS

Filed Nov. 21, 1961 5 Sheets-Sheet 4

March 17, 1964 T. A. JEEVES 3,125,675

COMPUTER CARRY CIRCUITS

Filed Nov. 21, 1961 5 Sheets-Sheet 5

United States Patent Office 3,125,675
Patented Mar. 17, 1964

3,125,675

COMPUTER CARRY CIRCUITS

Terry A. Jeeves, Verona, Pa., assignor to Westinghouse Electric Corporation, East Pittsburgh, Pa., a corporation of Pennsylvania Filed Nov. 21, 1961, Ser. No. 153,845
3 Claims. (Cl. 235—175)

This invention relates to carry circuitry for binary computers and the like, and more particularly to carry circuitry of the type described employing NOR logic circuit elements exclusively.

As is known, the speed of operation of a binary computer depends primarily upon the response time of the carry propagation circuitry employed therein. If NOR circuit elements are used in the carry propagation circuitry, it is highly desirable to employ as few of these elements as possible. In any carry propagation circuit of this type, a chain of NOR circuit elements are connected in cascade, while certain ones of the NOR elements will be turned On while certain others will be turned Off. The time for a change in the input to appear at the output of the chain is essentially the time required to turn Off, in sequence, those units in the chain which are On. This stems from the fact that the transistors used in the NOR elements can be turned On much more rapidly than they can be turned Off—a difference in response speed of as much as one hundred. Consequently, in order to increase the speed of the computer, it is necessary to employ as few NOR elements in the carry propagation circuitry as possible, and particularly those NOR elements having transistors which are normally On. Additionally, by employing fewer NOR elements, not only is the speed of the computer increased but the cost of the equipment is reduced as is its complexity.

Accordingly, as a primary object, the present invention seeks to provide new and improved high-speed computer circuitry employing NOR circuit elements.

More specifically, an object of the invention is to provide high-speed computer circuitry in which a minimum number of NOR circuit elements are used in the carry propagation circuitry of the computer.

A further object of the invention is to provide a computer, employing NOR circuit elements exclusively, which is simpler and cheaper than similar computers heretofore known.

Still another object of the invention is to provide carry propagation circuitry for a computer which employs circuit modules which may be used not only in the carry circuitry, but also in other circuits of the computer.

In the description of the invention which follows, the carry circuits will be described in connection with a parallel adder. However, it is to be understood that the circuits are not restricted to use with adders and may be used throughout the arithmetic unit of a digital computer, and in logical systems generally including multipliers, dividers and similar logical systems. In the description, conventional carry circuitry will be explained first. Next, embodiments of the faster carry circuitry of the present invention, having only two NOR elements per stage, will be described. Finally, a further improved embodiment of the invention will be described which is twice as fast as the first-mentioned embodiment and has only one NOR element per stage.

The above and other objects and features of the invention will become apparent from the following detailed description taken in connection with the accompanying drawings which form a part of this specification, and in which.

Figure 6:
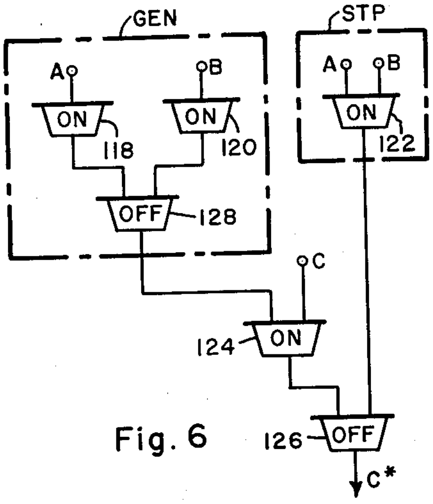
Figure 7:
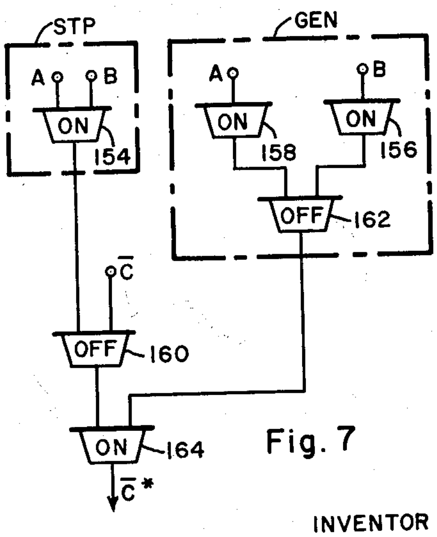
Figure 4:
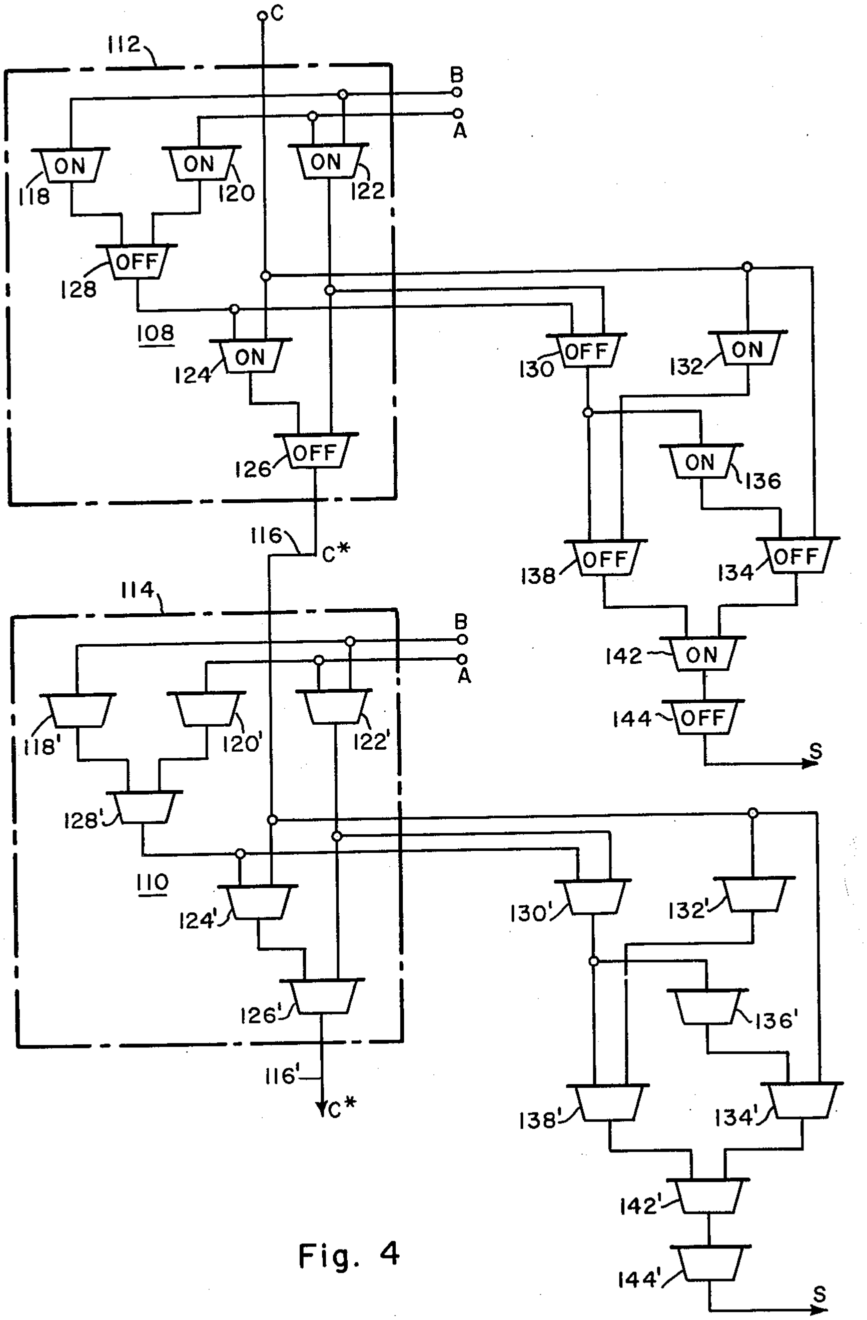
FIG. 4 is a block circuit diagram of one embodiment of the present invention in which an output carry signal is employed to link successive stages of an adder together.
Figure 5:
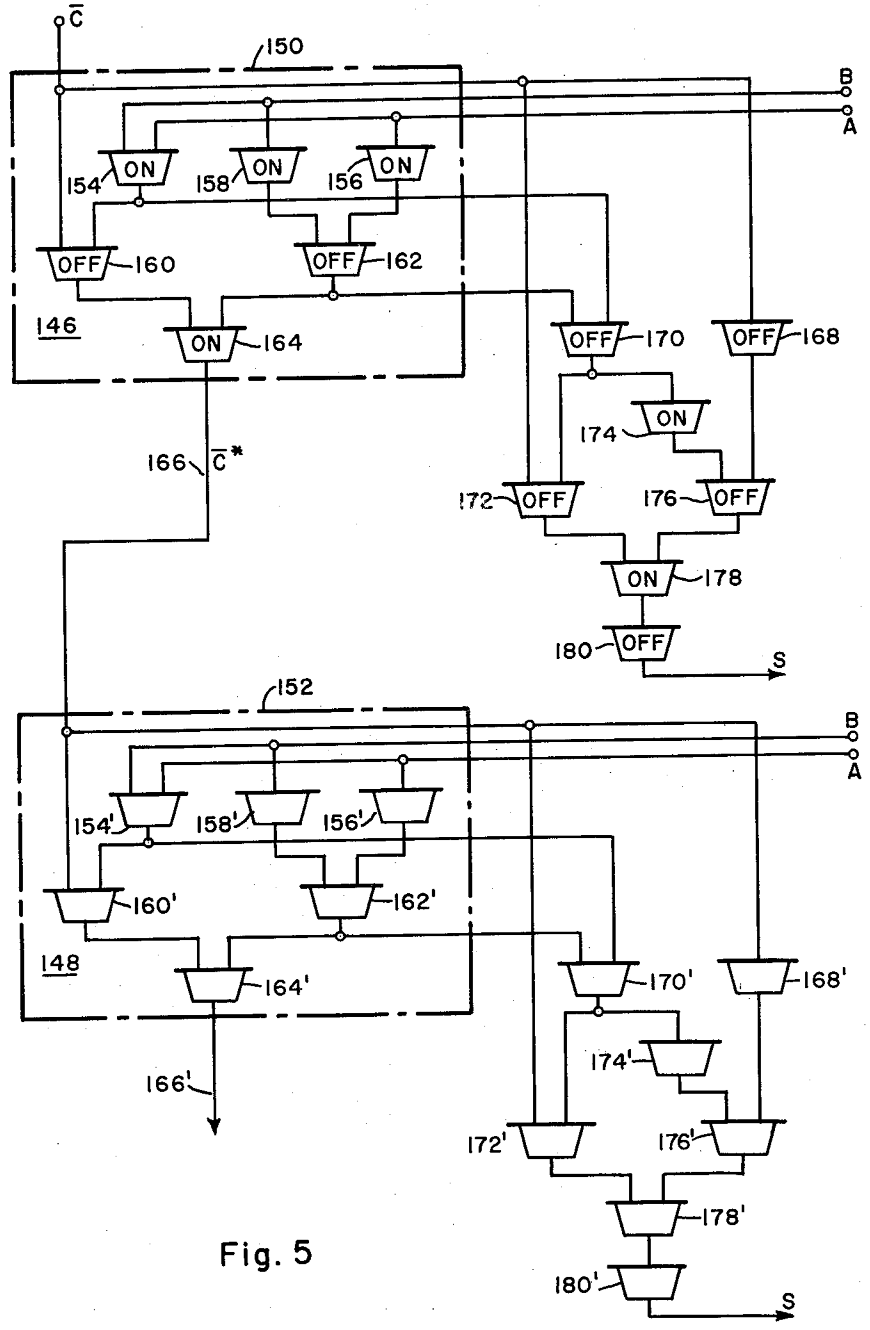
FIG. 5 is a block circuit diagram of an embodiment of the invention, similar to that of FIG. 4, but wherein an output no-carry signal is employed to link successive stages of the adder together.
Figure 8:
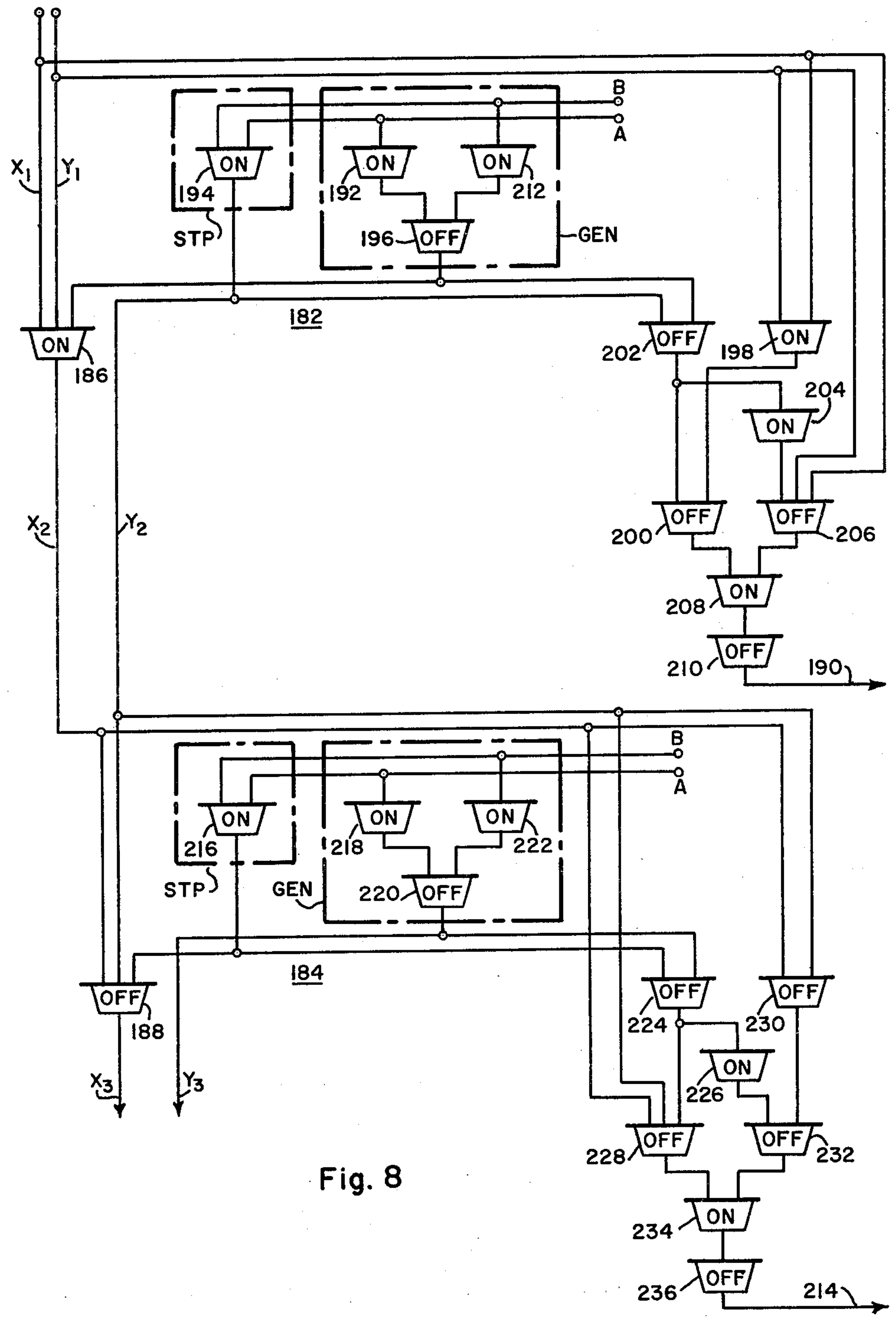

FIGS. 6 and 7 illustrate the common modular construction of the carry propagation circuits of the embodiments of FIGS. 4 and 5; and FIG. 8 is a block circuit diagram of an embodiment of the invention which is improved over those shown in FIGS. 4 and 5 in that its carry propagation time is only half that shown in the previous embodiments while it employs only one NOR logic element per stage of the adder.

Before considering the specific circuits of the invention, it would be well to consider the binary number system in general. This system uses the radix 2 rather than 10 as in the conventional decimal system. Therefore, it has only two coefficients, namely, 0 and 1.

For example, the number 3 may be written in binary form as follows:

$$3=011$$

which is shorthand for:

$$3=0\times2^2+1\times2^1+1\times2^0=0+2+1$$

Similarly, the numbers 4 and 5 may be written in binary form as follows:

$$4=100$$

$$5=101$$

which is shorthand for:

$$4=1\times2^2+0\times2^1+0\times2^0=4+0+0$$

$$5=1\times2^2+0\times2^1+1\times2^0=4+0+1$$

It can be seen that any binary number may be represented by an appropriate combination of the two binary coefficients, 0 and 1, although it requires many more of these two binary coefficients in appropriate combination to represent a given magnitude than it does to represent the same magnitude using decimal coefficients. The following Table I illustrates the binary representation of the numbers 1 through 10 wherein each variable or "bit" X varies between 0 and 1 only as described above:

TABLE I

*Representation of Binary Numbers*

| | $X_8$ | $X_4$ | $X_2$ | $X_1$ |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |

It can be seen that each binary number consists of an appropriate combination of "bits" wherein the first bit is $2^0$, the second is $2^1$, the third is $2^2$, the fourth is $2^3$, the *n*th is $2^n$, and so on.

The rules for addition of two binary numbers A and B to obtain a sum S are as follows:

Let us assume that 7 and 2 are to be added to obtain 9.

$$\text{Addend}=A=7=0111$$
$$\text{Augend}=B=2=0010$$
$$\text{Sum}=S=9=1011$$

In performing the foregoing addition, any odd number of 1's in a column is equal to 1 in the corresponding sum column, while an even number of 1's in a column is equal to 0 in the corresponding sum column. However, whenever the arithmetic sum of the 1's in a column is 2 or greater, a carry digit C of 1 must be carried to the next higher column and added to the 1's in that column. Thus, in the example given above, the number of 1's in the second column from the left is 2 so that a carry digit of 1 was carried to the third column from the left and added to the 1 in that column to produce a 0 in the sum digit. Therefore, to secure the proper sum digit S in a column, three quantities must be considered: the binary digit A, the binary digit B and the carry digit C from the adjacent lower-ordered column.

In a binary adder, for example, each column of "bits" is added in a stage having three input signals applied thereto. These input signals represent the binary digit A, the binary digit B and the carry input digit C. Furthermore, the output signals will represent the sum digit S and the carry output digit C* which is applied to the next successive or higher ordered stage of the adder as a carry input digit. Since there are only two binary coefficients, 0 and 1, the input signals may be represented as On, Off; plus voltage, minus voltage; pulse, absence of pulse; open relay, closed relay, and so on.

From a consideration of the foregoing rules of addition, it should be apparent that the operation of a binary adder may be represented by the following Table II of possible combinations:

TABLE II

*Possible Combinations of Digits in Binary Adder Stage*

| | Possible combinations | | | | | | | |
|---|---|---|---|---|---|---|---|---|
| A=Addend Digit | 0 | 1 | 0 | 1 | 0 | 1 | 0 | 1 |
| B=Augend Digit | 0 | 0 | 1 | 1 | 0 | 0 | 1 | 1 |
| C=Carry Input Digit | 0 | 0 | 0 | 0 | 1 | 1 | 1 | 1 |
| S=Sum Digit | 0 | 1 | 1 | 0 | 1 | 0 | 0 | 1 |
| C*=Carry Output Digit | 0 | 0 | 0 | 1 | 0 | 1 | 1 | 1 |

Furthermore, the carry output digit may be expressed as follows:

$$C^*=A\cdot B\cdot \overline{C}+A\cdot \overline{B}\cdot C+\overline{A}\cdot B\cdot C+A\cdot B\cdot C$$

where a digit with a bar over it represents an Off signal (i.e., a 0 in the foregoing table); a digit without a bar over it represents an On signal (i.e., a 1 in the foregoing table); + is equivalent to "or"; and · is equivalent to "and." Therefore, stated in other words, the adder will produce a carry output C* whenever there are two or more On input signals representing the A, B and C digits. This, of course, is evidenced also from the foregoing table.

Conversely, the inverse of the carry output signal $\overline{C}^*$ may be expressed as follows:

$$\overline{C}^*=\overline{A}\cdot \overline{B}\cdot \overline{C}+A\cdot \overline{B}\cdot \overline{C}+\overline{A}\cdot B\cdot \overline{C}+\overline{A}\overline{B}C$$

In other words, the inverse of the carry output signal (i.e., no-carry output signal) will be produced whenever there are two or more Off signals representing the A, B and C digits.

Adders can be constructed wherein a carry output signal C* is produced by each stage of the adder and applied to the next successive stage as a carry input signal, or wherein a no-carry output signal $\overline{C}^*$ is produced and applied to the next successive stage as the carry input signal with the same overall effect. Consequently, in constructing an adder, circuitry must be provided which will either produce an On output signal in response to two or more On input signals (carry C*) or an Off output signal in response to a combination of two or more Off input digits A and B and C (no-carry $\overline{C}^*$). The present invention is concerned with such carry circuitry and particularly such carry circuitry employing NOR elements exclusively.

Figure 1:
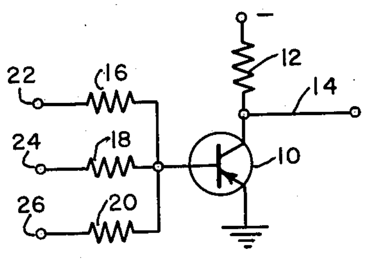
FIGURE 1 is a schematic circuit diagram of a NOR circuit element.

Referring now to FIG. 1, a typical NOR circuit element is shown and includes a PNP junction transistor 10 having its emitter grounded and its collector connected through resistor 12 to a source of negative voltage, not shown, the arrangement being such that when the transistor 10 is cut off, a high negative voltage will appear on output lead 14. When the transistor conducts, however, it will act as a closed switch so that the output lead 14 will be essentially at ground potential. Connected to the base of transistor 10 are three input leads each having a resistor 16, 18 or 20 therein. The circuit is such that the transistor 10 will normally be cut off whereby a high negative voltage will appear on output lead 14. When, however, a negative input signal is applied to any one of the input terminals 22, 24 or 26, transistor 10 will be driven to saturation so that the voltage on output lead 14 rises until it assumes ground potential. Furthermore, the transistor 10 will conduct to raise the voltage on output lead 14 regardless of whether one, two or three negative input signals are applied to the terminals 22–26. When the transistor 10 is cut off and a high negative voltage appears on lead 14, the NOR circuit is said to be "On"; whereas, whenever a negative input signal is applied to any one of the leads 22–26 and the transistor 10 conducts to drive the voltage on output lead 14 to near ground potential, the NOR circuit element is said to be "Off." From a consideration of the circuit, it will be seen that the illustration of three input terminals is for purposes of explanation only, it being understood that the number of input terminals will depend upon the number of input signals and may extend from one up to any practical number.

When two NOR circuit elements such as that in FIG. 1 are connected in cascade such that the output lead 14 of one circuit is connected to one of the terminals 22–26 of a succeeding circuit, it can be seen that if the first NOR element is "On" then the second or succeeding NOR element must be "Off." In like manner, when the first NOR element is "Off" then the second NOR element will be "On," assuming that there are only two NOR elements involved. If, however, three NOR elements are connected to the respective input terminals 22, 24 and 26 of the circuit of FIG. 1, then the circuit shown in FIG. 1 will be switched from an "On" condition to a "Off" condition whenever any one of the three NOR elements connected to the terminals 22, 24 and 26 is "On" so that a negative voltage is applied to its associated terminal.

In the claims which follow this specification, the terminals 22, 24 and 26 are referred to as the "input" to a NOR element; whereas, lead 14 is referred to as the "output." Therefore, whenever one or more signals are "applied to the input" of the NOR element, they may be applied to any one or more of the terminals 22–26 or, for that matter, to any number of input terminals.

Figure 2:
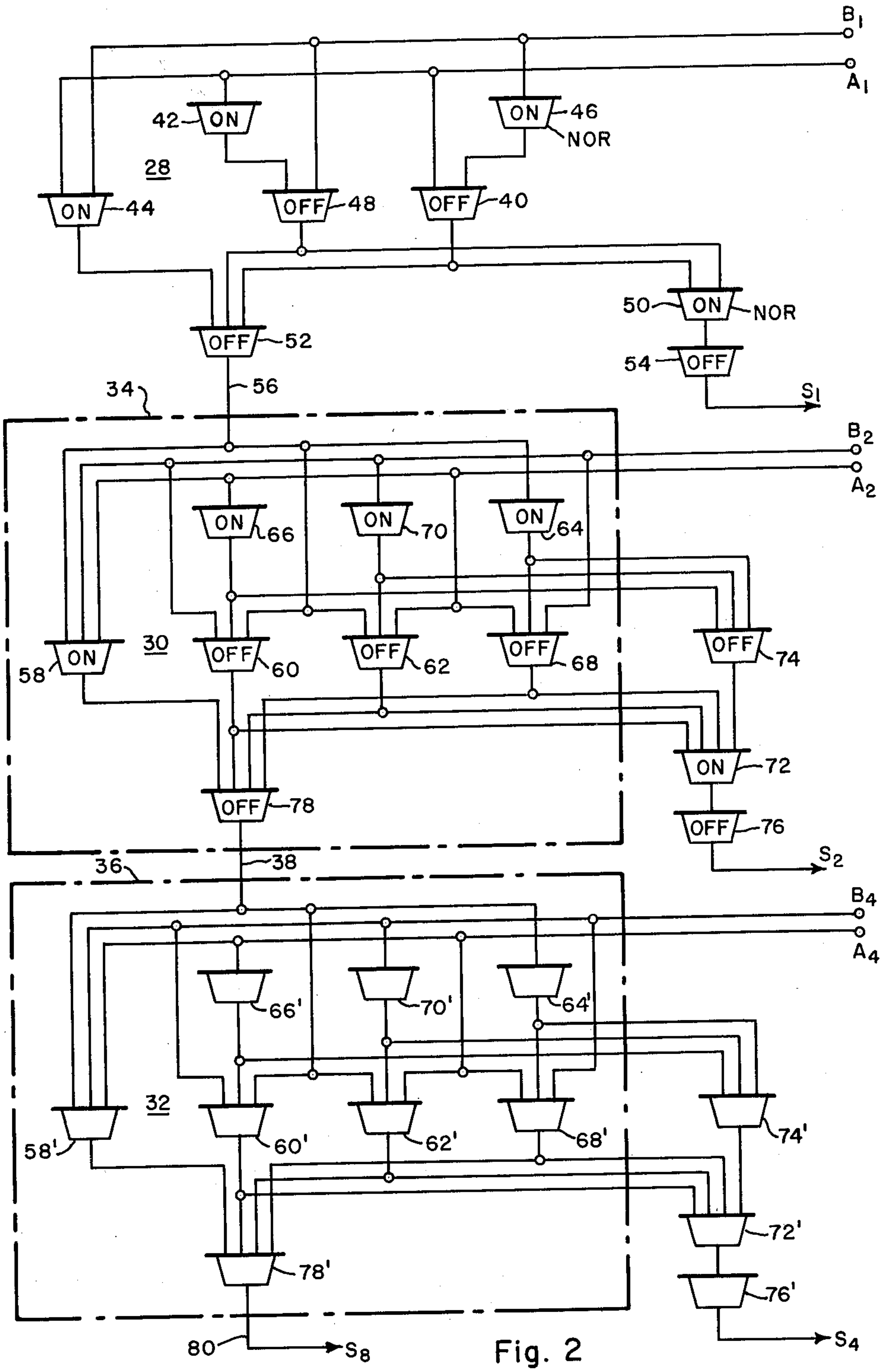
FIG. 2 is a block circuit diagram of a conventional binary adder employing NOR circuit elements such as that shown in FIG. 1, and wherein an output carry signal is employed to link successive stages of the adder together.

Referring now to FIG. 2, a conventional binary adder is shown which includes three stages 28, 30 and 32. This adder is capable of producing a sum up to fourteen only. Stage 30 includes a conventional NOR carry circuit 34, enclosed by broken lines, while stage 32 includes an identical NOR carry circuit 36, also enclosed by broken lines.

If it is assumed that we are adding two binary numbers A and B, the one bit for the A digit will be applied to terminal $A_1$ in FIG. 2, the two bit in the A digit will be applied to terminal $A_2$ in stage 30, and the four bit in the A digit will be applied to the terminal $A_4$ in stage 32.

Similarly, the one bit of the B digit will be applied to terminal $B_2$, and the four bit of the B digit will be applied to terminal $B_4$. The sum digit will appear in bits at leads $S_1$, $S_2$, $S_4$ and $S_8$. Therefore, if we are again adding the numbers 7 and 2, the addition may be represented as follows:

| | | | | |
|---|---|---|---|---|
| 7=A= | $A_4$ | $A_2$ | | $A_1$ |
| | 1 | 1 | | 1 |
| 2=B= | $B_4$ | $B_2$ | | $B_1$ |
| | 0 | 1 | | 0 |
| 9=S= | $S_8$ | $S_4$ | $S_2$ | $S_1$ |
| | 1 | 0 | 0 | 1 |

If it is assumed that each 1 illustrated above represents an "On" signal and that each "On" signal is a negative voltage, then in order to obtain the right answer, negative signals should appear at leads $S_1$ and $S_8$ while no signals will appear at leads $S_2$ and $S_4$. Furthermore, since there are two 1's in the second column outlined above, a carry signal C* should appear on lead 38 at the output of carry circuit 32.

Referring now to the first stage of the adder shown in FIG. 2, the $A_1$ signal is applied to NOR elements 40, 42 and 44. In like manner, the $B_1$ signal will be applied to NOR elements 46, 48 and 44. The output of NOR element 40 is applied to NOR elements 50 and 52 as is the output of NOR element 48. The output of NOR element 44, however, is applied only to the NOR element 52. At the output of NOR element 50 is a NOR element 54, the output of which is the sum signal $S_1$.

As shown in the drawing, NOR elements 46, 42, 44 and 50 will be normally On; whereas NOR elements 40, 48, 52 and 54 will be normally Off. This means, in effect, that before any input signals are applied to terminals $A_1$ and $B_1$, the carry output signal on lead 56 will be zero as will the sum signal on lead $S_1$.

Let us assume, now, that $A_1$ is 1 or On while $B_1$ is 0 or Off. Since $A_1$ is On, meaning that it has a negative signal applied thereto, the NOR element 42 will be switched from the On condition to the Off condition as will the NOR element 44. Since NOR element 42 is now Off, and since the signal $B_1$ is also Off, the NOR element 48 will switch from the Off condition to the On condition to retain the NOR element 52 in its Off condition wherein no carry signal C* appears on lead 56.

Since NOR element 48 is now On, NOR element 50 will switch Off while NOR element 54 will switch On whereby a negative signal will appear at lead $S_1$, meaning that the total for this column is 1. This, of course, is the correct answer as indicated above.

In the second stage 30, a carry signal C* on lead 56 is applied to each of four NOR elements 58, 60, 62 and 64. The $A_2$ signal is applied to NOR elements 58, 66, 62 and 68, and the $B_2$ signal is applied to the NOR elements 58, 60, 70 and 68. The outputs of NOR elements 60, 62 and 68 are all applied to NOR element 72 as is the output of NOR element 74. NOR element 74, in turn, has applied thereto the outputs of NOR elements 66, 70 and 64. Connected to the output of NOR element 72 is the NOR element 76 having output lead $S_2$ connected to its output.

As shown in the drawing, NOR elements 58, 66, 70, 64 and 72 are normally On whereas NOR elements 60, 62, 68, 74, 76 and 78 are normally Off. The function of the carry circuit 34 enclosed by broken lines is to produce an output On signal on lead 38 whenever two or more of the signals $A_2$, $B_2$ or C on lead 56 are On. Let us assume, for example, that signal $A_2$ and the signal C on lead 56 are On. Under these conditions, the NOR element 58 will be switched from its normally On condition to an Off condition since it now has two On signals applied thereto. The NOR elements 60, 62 and 68, however, will all remain Off since each has at least one On signal applied to its input. Consequently, we now have four Off signals leading to NOR element 78 so that this element switches from the Off condition to the On condition wherein an output signal C* will appear on lead 38.

Since we have two On signals applied to the stage 30, an Off signal should appear at lead $S_2$, meaning that NOR element 76 should not be changed from its normally Off condition. This will occur since under the conditions described, each of the NOR elements 60, 62, 68 and 74 will be Off. The manner in which elements 60, 62 and 68 remain Off was described above. With reference to element 74, elements 66 and 64 will switch from their normally On condition to an Off condition since they have On signals applied thereto. The element 70, however, which is connected to terminal $B_2$, has no On signal applied thereto so that it remains On and this single On signal maintains NOR element 74 in its Off condition. Consequently, elements 72 and 76 will be On and Off, respectively, to produce an Off condition at lead $S_2$ which is the correct answer as indicated above. If all three signals $A_2$, $B_2$ and C on lead 56 are On, then a carry output signal C* should appear on lead 38 as well as an On signal on lead $S_2$. Under these conditions, the NOR element 58 will be switched from its On condition to an Off condition since it now has three On signals applied thereto. Similarly, each of the NOR elements 60, 62 and 68 will be Off since it has at least two On signals applied thereto. Thus, NOR element 78 will switch from its Off condition to its On condition to produce a carry output signal C* on lead 38. At the same time, each of the NOR elements 66, 70 and 64 will have been switched from its On condition to its Off condition, meaning that NOR element 74 is switched from the Off condition to the On condition. Consequently, the states of NOR elements 72 and 76 will be reversed so that an On signal will appear on lead $S_2$, which is the correct answer. The stage 32 is identical to stage 30; and, accordingly, elements in stage 32 which correspond to elements in stage 30 are indicated by identical primed reference numerals. As was the case with stage 30, an On signal will appear on lead 80 whenever two of the three signals $A_4$, $B_4$ or the carry input signal C on lead 38 are On. At the same time, the proper sum signal will appear on lead $S_4$.

From the foregoing, it can be seen that the purpose of the carry circuits 34 and 36 is to produce an On signal whenever two or more of the signals leading into it are On or, in the present case, are negative. Considering the carry circuit 34, for example, it includes eight NOR elements; and the delay, the number of elements between the input carry signal C on lead 56 and the output carry signal C* on lead 38 is three. Consequently, the time required for an $n$ stage adder to operate when this carry circuitry is used is proportional to $3n$.

In the circuit of FIG. 2, the carry circuitry 34 or 36 produced a carry output signal C* when two or more of the input signals $A_2$, $B_2$ and the carry input signal C were On. A computer, however, can be constructed with the same effect wherein a no-carry output signal $\bar{C}$* is produced rather than a carry signal C*. In the example given above the no-carry signal $\bar{C}$* will be positive or 0 rather than negative or 1. That is, the no-carry circuit is effectively the inverse of the carry signal. In this case, a no-carry circuit is employed rather than a carry circuit as in the embodiment shown in FIG. 2.

Figure 3:
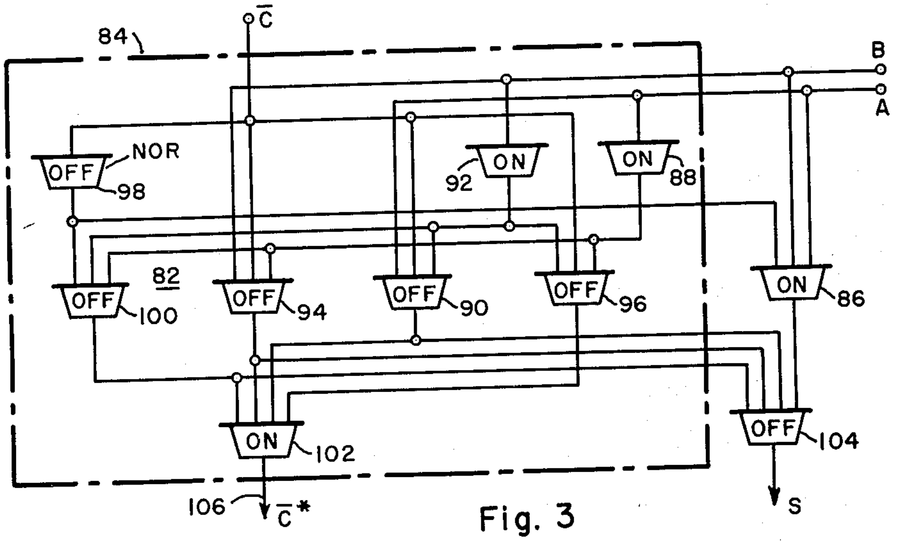
FIG. 3 is a block circuit diagram of a single stage of a binary adder similar to that shown in FIG. 2, but wherein an output no-carry signal is employed to link successive stages of the adder together.

In FIG. 3, a single stage 82 of a no-carry adder is shown wherein the no-carry circuitry is enclosed by broken lines and identified by the numeral 84. The signal on terminal A is applied to NOR elements 86, 88 and 90, while the signal on terminal B is applied to NOR elements 86, 92 and 94. The carry input signal $\bar{C}$ is applied to NOR elements 96, 90, 94 and 98. The output of NOR element 88 is applied to elements 96, 94 and 100; the output of NOR element 92 is applied to elements 96, 90 and 100; while the output of NOR element 98 is applied to element 86 as well as element 100. The input to NOR element 102 is connected to the output of elements 100, 94, 90 and 96; while the input to NOR element 104 in the summing circuit is connected to the outputs of NOR elements 86, 90, 94 and 100. The normal states of the respective elements are as indicated on the drawings.

Remembering that the no-carry input signal $\overline{C}$ is the inverse of the carry input signal C employed in FIG. 2, a no-carry output signal should appear on lead 106 whenever two or more of the three input signals are Off. That is:

$$\overline{C}^* = \overline{A}\cdot\overline{B}\cdot\overline{C} + A\cdot\overline{B}\cdot\overline{C} + \overline{A}\cdot B\cdot\overline{C} + \overline{A}\cdot\overline{B}\cdot C$$

Therefore, if an On signal is applied to terminal A in FIG. 3, two Off signals remain on the terminals so that a no-carry output signal $\overline{C}$* should appear on lead 100, meaning that NOR element 102 should be switched Off. At the same time, since only one of the three signals A, B and $\overline{C}$ has been changed, an On signal should appear on lead S in accordance with the foregoing rules of addition. With an On signal on terminal A, NOR element 88 will be switched Off. However, element 96 will also remain Off since it has the output of On element 92 still applied thereto. Consequently, the states of conduction of elements 100, 94, 90 and 96 do not change and element 102 remains On to produce the desired no-carry output signal $\overline{C}$*. The normally On element 86, however, is now switched Off so that element 104 is switched On to produce the desired On signal on lead S.

If On signals are applied to both terminals A and B, however an Off no-carry output signal $\overline{C}$* is produced on lead 106 since elements 88 and 92 will now both be Off to switch element 96 On and element 102 Off. At the same time, an Off signal will be produced at lead S since element 100 is switched On by three Off signals applied thereto from elements 88, 92 and 98. When element 100 switches On, element 104 must remain Off to obtain the desired result even though element 86 is now Off.

In a similar manner, it can be shown that when the signals applied to terminals A and B are On while that applied to terminal $\overline{C}$ is Off, element 102 will be switched Off to produce a no-carry output signal $\overline{C}$* while the signal on lead S will be On. Likewise, if only one On signal is applied to terminal A or B while an Off signal is applied to terminal $\overline{C}$, element 104 will remain Off while element 102 will be switched Off.

As was the case with the embodiment shown in FIG. 2, the carry circuit 84 includes eight NOR elements and the delay, the number of elements between the input no-carry signal and the output no-carry signal, is three.

In accordance with the present invention, the carry circuitry 34 or 36 of FIG. 2 may be simplified as shown in FIG. 4 wherein two stages 108 and 110 of a binary adder are shown while the carry circuits are enclosed by broken lines and identified by the numerals 112, 114. As was mentioned above, in the case of carry circuitry, an On output carry signal C* should appear on lead 116 whenever two or more On signals are applied to input terminals A, B and C. In the improved circuit of the invention, the signal A is applied to each of NOR elements 120 and 122; while the B signal is applied to NOR elements 118 and 122. The C signal is applied to the NOR element 124 having its output applied to NOR element 126. The outputs of elements 118 and 120 are applied to the input of NOR element 128; the output of NOR element 128 is applied to the input of NOR element 124; and the output of NOR element 122 is applied to the input of NOR element 126. The normal states of the NOR elements are as indicated on the drawing. If it is assumed that only a single On signal is applied to terminal A, NOR elements 120 and 122 will be switched from their normally On conditions to Off conditions. NOR element 126, however, will still remain Off since NOR elements 124 and 128 are On and Off, respectively, the element 128 being Off since element 118 is On. If, however, both of the signals A and B are On, all three of the NOR elements 118, 120 and 122 will be switched from their On conditions to their Off conditions. This means, in effect, that NOR element 128 will switch from its Off condition to its On condition, and NOR element 124 will switch from its On condition to its Off condition. Since element 126 now has two Off signals leading into it, it will switch to its On condition wherein an On output carry signal C* will appear on lead 116. Similarly, if the signals applied to terminals A and C or B and C are both On, then the NOR elements 122 and 124 will be switched from their On conditions to their Off conditions wherein an On output carry signal C* will appear on lead 116. A similar result is obtained if all these signals on terminals A, B and C are On.

From the foregoing description, it should be apparent that the carry circuit 112 performs the same function as carry circuits 34 and 36 shown in FIG. 2. However, it has only six NOR elements as contrasted with the eight elements used in circuits 34 and 36. Furthermore, it has a delay of only two as contrasted with a delay of three for the circuit of FIG. 2. This represents a 25% saving in components and a 33% faster operation.

In order to obtain a sum signal with the circuitry of FIG. 4, the outputs of NOR elements 128 and 122 are applied to NOR element 130 while the input carry signal C is applied to NOR elements 132 and 134. The output of NOR element 130 is applied to NOR elements 136 and 138, while the output of NOR element 132 is also applied to the input of NOR element 138. The output of NOR element 136 is applied to the input of NOR element 134 along with the input carry signal C. The outputs of elements 138 and 134 are both applied to the input of NOR element 142. To obtain the sum signal, the output of element 142 is inverted in NOR element 144. As was the case with circuit 112, the normal states of the various NOR elements in the summing circuitry are indicated on the drawing.

Remembering the rules for addition outlined above, if only one On signal is applied to any one of the terminals A, B or C, an On output signal should appear at lead S. Let us assume, for example, that the signal applied to terminal A is On. Under these conditions, NOR element 122 will be switched from its On condition to its Off condition so that two Off signals are now applied to the input to NOR element 130, thereby switching this element to its On condition. When element 130 switches from its Off condition to its On condition, NOR element 136 will switch from its On condition to its Off condition. This means that element 134, having no On input signals applied thereto since signal C is Off, will now switch to its On condition whereby element 142 is Off and element 144 is On to produce the desired output On signal.

If two On signals are applied to terminals A, B and C, however, an Off output signal should appear on lead S. Let us assume, for example, that the signals applied to terminals A and C are On. This means that NOR element 122 switches from its On condition to its Off condition; and, since the signal applied to terminal C is now On, the element 132 in the summing circuit will switch from its On condition to its Off condition. With element 122 Off, element 130 will switch from it Off condition to its On condition. Thus, the elements 130 and 132 will reverse states, but since they both lead to the element 138, the condition of this element will remain the same. In a similar manner, the condition of element 134 will remain the same so that an Off output signal will appear on lead S. That is, element 134 will remain Off since it will have an On signal C applied thereto even though the element 136 is switched from its On condition to its Off condition by element 130. Similarly, it can be shown that with three On input signals applied to the terminals A, B and C, an On output carry signal C* will appear on lead 116 and an On sum signal will appear on lead S.

The second stage 110 is identical to the first stage 108 and accordingly, corresponding elements in stage 110 are identified by identical primed reference numerals.

The simplified circuitry of the present invention corresponding to the no-carry circuitry shown in FIG. 3 is illustrated in FIG. 5 wherein two stages 146 and 148 of an adder are shown and wherein the no-carry circuits 150 and 152 are enclosed by broken lines. In this case, input signal A is applied to NOR elements 154 and 156, while the signal B is applied to NOR elements 154 and 158. The input no-carry signal $\overline{C}$ is applied to NOR element 160 only in the no-carry circuit 150. The output of element 154 is applied to the input of element 160, and the outputs of elements 158 and 156 are both applied to the input of element 162. NOR element 164 has its output connected to the outputs of NOR elements 160 and 162, respectively. If only a single On signal is applied to terminal A, for example, NOR element 156 will be switched from its On condition to its Off condition as will NOR element 154. NOR elements 160 and 162, however, will remain in their Off conditions since element 160 has an On $\overline{C}$ signal applied thereto and element 162 has an On signal applied thereto from element 158. If, however, both of the signals applied to terminals A and B are On, both of the NOR elements 158 and 156 will switch from their On conditions to their Off conditions, thereby switching NOR element 162 from its Off condition to its On condition and NOR element 164 from its On condition to its Off condition to produce an Off no-carry output signal $\overline{C}$*. Similarly, if the signal applied to terminal A is On while the no-carry input signal $\overline{C}$ is Off, meaning that a carry input signal is applied to the stage, the NOR element 154 will switch from its On condition to its Off condition, meaning that two Off signals are applied to NOR element 160 so that it will switch from its Off condition to its On condition, and the NOR element 164 will switch from its On condition to its Off condition to produce an Off no-carry output signal $\overline{C}$*. Thus, whenever there is an odd number of changes in the signals applied to terminals A, B and $\overline{C}$, an On sum signal will appear at the output of element 180. At the same time, whenever two or more of the signals on terminals A, B and $\overline{C}$ are Off, an Off no-carry output signal $\overline{C}$* will appear on lead 166.

The summing circuit for stage 146 includes NOR element 168 which is normally Off since it is connected to the normally On no-carry input signal $\overline{C}$. The summing circuit also includes NOR element 170 which is normally Off since it is connected at its input to the normally On element 154 in no-carry circuit 150. The output of NOR element 170 is applied to the input of NOR elements 172 and 174 which are normally Off and On, respectively; whereas the outputs of elements 174 and 168 are applied to the normally Off element 176. The outputs of elements 172 and 176 are then applied to the normally On element 178, the output of which is applied to the normally Off element 180. If a single On signal is applied to either terminal A or B, then an On signal should appear on lead S. Thus, if the On signal is applied to terminal A, element 154 will be shifted from its normally On condition to an Off condition, thereby switching element 170 from an Off condition to an On condition since element 162 leading into it is now Off also. This will switch element 174 from an On condition to an Off condition and element 176 from an Off condition to an On condition. Elements 178 and 180 will, therefore, be switched to Off and On conditions, respectively, whereby an On signal will appear on output lead S. If, however, two On signals are applied to terminals A and B, an Off signal will appear on lead S. This is true since with the two On signals on terminals A and B both elements 158 and 156 will be switched to Off positions whereby element 162 is switched to an On position. Since element 162 is now On, element 170 will remain Off even though element 154 is now Off also so that elements 174, 176, 172, 178 and 180 will remain in their conditions indicated on the drawing to produce an Off signal on output lead S. Similarly, if an On signal is applied to terminal A, for example, and an Off signal to terminal $\overline{C}$, an Off signal will be produced on lead S since, although elements 170 and 174 will reverse their conditions shown in the drawings, element 168 will also reverse its condition so that both of the elements 172 and 176 will remain Off.

The stage 148 is identical to stage 146 already described; and accordingly, elements in stage 148 which correspond to identical elements in stage 146 are indicated by primed reference numerals.

As was the case with the embodiment of the invention shown in FIG. 4, the carry circuits 146 and 148 employ only six elements as contrasted with the eight shown in FIG. 3, and the delay involved is two as contrasted with three for the embodiment of FIG. 3.

Referring now to FIGS. 6 and 7, it will be seen that the carry circuits 112 and 150 of FIGS. 4 and 5, respectively, contain common circuit modules. These modules, enclosed by broken lines, may be identified as the GEN or "generate carry" module and the STP or "stop carry" module. When both of the signals applied to terminals A and B are zero or Off, no carry signal can possibly be generated. For example, with reference to FIG. 6, when both of the signals applied to terminals A and B are Off, NOR element 122 must be On to hold element 126 Off whereby no carry signal is generated. Similarly, in FIG. 7, when the signals applied to both terminals A and B are Off, NOR element 154 will remain On, meaning that element 160 will have to remain Off. In the absence of On signals at the inputs to NOR elements 158 and 156, the NOR element 162 will also remain Off to hold element 164 in its On condition.

On the other hand, when both the signals applied to terminals A and B are 1 or On, then a carry must be propagated regardless of the condition of the signal applied to terminal C or terminal $\overline{C}$. For example, if in FIG. 6 the signals applied to terminals A and B are both On, the NOR element 122 must be Off. Similarly, elements 118 and 120 must be Off so that element 128 will be On to switch element 124 Off, regardless of the condition of the input carry signal C. Thus, element 126 will now have two Off signals leading into it, meaning that it must switch On to produce a carry signal. Similarly, in FIG. 7, when the signals applied to terminals A and B are both On, NOR elements 158 and 156 must switch Off, meaning that element 162 will switch On to insure that element 164 is Off to produce a no-carry output signal. It is thus apparent that the modules GEN and STP may be used in either one of the carry circuits shown in FIGS. 4 and 5 as well as in other parts of the computer. Thus, in FIG. 4 the GEN module could be used for the NOR elements 130, 132 and 138 shown in the summing circuit. Similarly, it could be used for the NOR elements 138, 134 and 142.

In FIG. 8, another embodiment of the invention is shown which is improved over that shown in FIGS. 4 and 5 in that it is twice as fast as the previous embodiments and has only one NOR logic element per stage. Two stages are shown in FIG. 8 and are indicated generally by the numerals 182 and 184. In this embodiment, actually two carry signals are employed rather than one. These carry signals appear on the leads $X_1$—$Y_1$, $X_2$—$Y_2$ and $X_3$—$Y_3$. It will be noted, however, that only one NOR element 186 is interposed between the input and output carry signals in stage 182; and, similarly, only one NOR element 188 is interposed between the input and output carry signals in stage 184. Both stages 182 and 184 employ the STP and GEN modules shown and described with reference to FIGS. 6 and 7.

In the embodiment of FIG. 8, there will be a carry input signal to stage 182 if either the signal on lead $X_1$ or lead $Y_1$ is On. However, if the signals on leads $X_1$ and $Y_1$ are both Off, there is an absence of a carry input signal. The reverse is true with respect to leads $X_2$ and $Y_2$. That is, if there are Off signals on both leads $X_2$ and $Y_2$, a carry input signal is generated to stage 184.

Conversely, if either the signal on lead $X_2$ or lead $Y_2$ is On, then there is an absence of a carry input signal for stage 184. At the output of stage 184, however, the condition is reversed and reverts to that explained with respect to leads $X_1$ and $Y_1$. That is, if OFF signals appear on both leads $X_3$ and $Y_3$, an output signal is not generated at stage 184. If, however, an On signal appears on either lead $X_3$ or $Y_3$, a carry output signal is generated.

Let us assume, for purposes of explanation, that there is an absence of a carry input signal to stage 182, meaning that Off signals appear on both leads $X_1$ and $Y_1$. Let us assume, further, that the signal applied to terminal A is On; whereas that applied to terminal B is Off. Remembering the rules for addition outlined above, under these circumstances, an output carry signal should not be generated by stage 182; however, an On signal should appear on lead 190 at the output of the summing circuitry. If the signal applied to terminal A is On, NOR element 192 will switch Off as will NOR element 194. This means that an Off signal will now be generated on lead $Y_2$. However, NOR element 186 will still remain On since element 196 is Off as are the signals on leads $X_1$ and $Y_1$. Thus, the presence of the On signal on lead $X_2$ indicates that an output signal is not generated by stage 182.

In the summing circuitry, the Off signals on leads $X_1$ and $Y_1$ are applied to a normally On NOR element 198, meaning that this element remains On and keeps element 200 Off. Since, however, NOR element 194 is switched from its On condition to an Off condition, the element 202 in the summing circuit now has two Off signals leading into it so that it switches to an On condition wherein the element 204 is switched Off. When element 204 switches Off, element 206 will switch On as it now has three Off signals leading into it, it being remembered that the signals on leads $X_1$ and $Y_1$ are both Off. When element 206 switches On, element 208 switches Off while element 210 switches On to produce the desired On signal on lead 190.

Now, let us assume that the signals applied to terminals A and B are both On, meaning that an output carry signal should be generated by stage 182 and that the signal on lead 190 should be Off, indicating a sum of zero. Under these conditions, both NOR elements 192 and 212 will be switched Off as will element 194. When elements 192 and 212 switch Off, element 196 is switched On, meaning that NOR element 186 will be switched Off to produce two Off signals on leads $X_2$ and $Y_2$, thereby indicating that a carry output signal was generated by the stage 182. With element 196 On, element 202 will remain in its Off condition so that all of the NOR elements in the summing circuit will retain their states shown in the figure, and an Off signal will appear on lead 190.

Now, let us assume that an On signal is applied to terminal A and that a carry input signal is applied to stage 182, meaning that the signal on lead $X_1$, for example, will be On rather than Off. Under these conditions a carry output signal should be generated by stage 182, but the signal appearing on lead 190 should be Off. With the signal on lead $X_1$ On, NOR element 186 switches Off so that an Off signal appears on lead $X_2$. At the same time, since the signal applied to terminal A is On, NOR element 194 switches Off so that the signal on lead $Y_2$ is also Off, meaning that there are Off signals on both leads $X_2$ and $Y_2$ to indicate that a carry signal was generated. Since element 194 is Off and element 196 is also Off at this time, the element 202 will switch On to switch Off element 204. Nevertheless, element 206 will remain Off since it has an On signal applied thereto via lead $X_1$. Similarly, element 200 will remain Off so that elements 208 and 210 will retain the states shown in the drawing whereby an Off signal will be produced on lead 190.

Referring now to stage 184, it will be remembered that there is an absence of a carry input signal to this stage when either the signal on lead $X_2$ or $Y_2$ is On. However, the stage generates an output carry signal if the signal on either lead $X_3$ or $Y_3$ is On. If the signals on leads $X_3$ and $Y_3$ are both Off, there is an absence of an output carry signal generated by stage 184.

Let us assume, for example, that there is an absence of a carry input signal to stage 184, meaning that the signal on lead $X_2$, for example, is On. Let us assume further that the signal applied to terminal A in stage 184 is On. Under these conditions, there should be an absence of an output carry signal from stage 184, and the sum signal appearing on lead 214 should be On. With the signal on terminal A On, NOR element 216 will switch Off, but since at least one of the signals on lead $X_2$ or $Y_2$ is On, the NOR element 188 remains Off. The On signal applied to terminal A in stage 184 will also switch element 218 Off, but element 220 will remain Off since element 222 is still On. Thus, with elements 188 and 220 Off, two Off signals appear on leads $X_3$ and $Y_3$ indicating that there is an absence of a carry output signal from stage 184. In the summing circuit, the outputs of elements 216 and 220 are applied to element 224; and since they are both now Off, element 224 switches On to switch Off element 226. Elements 228 and 230 in the summing circuit will remain Off since both have at least one On signal applied thereto via lead $X_2$ or $Y_2$. Thus, with elements 226 and 230 Off, element 232 switches On. This will switch element 234 Off and element 236 On to produce the desired On output signal at lead 214.

On the other hand, if two On signals are applied to input terminals A and B in stage 184, then an output carry signal should be generated at stage 184 and there should be an Off signal on lead 214. To generate the output carry signal from stage 184, either the signal on lead $X_3$ or $Y_3$ should be On. With On signals applied to both of terminals A and B in stage 184, NOR element 220 will switch On, thereby producing the desired On signal on lead $Y_3$. At the same time, in the summing circuit, element 224 will remain Off since it now has an On signal applied thereto by element 220. In addition, elements 228 and 230 will remain Off since there was an absence of a carry input signal to the stage 184. Consequently, all of the NOR elements in the summing circuit will remain in their states shown in the drawing so that an Off sum signal is produced on lead 214 in accordance with the desired result.

If a carry input signal is applied to stage 184, the signals on leads $X_2$ and $Y_2$ will both be Off. If we combine this condition with an On signal on terminal A in stage 184, for example, then a carry output signal should be generated by stage 184 and there should be an Off signal on lead 214. With both of the signals on leads $X_2$ and $Y_2$ Off, and with NOR element 216 Off in response to the On signal on terminal A, NOR element 188 will now have three Off signals leading into it so that it switches On to produce an On signal on lead $X_3$, thereby indicating the presence of a carry output signal from stage 184. At the same time, in the summing circuit, the element 230 will now switch On since it has two Off signals applied thereto so that element 232 will remain Off, even though elements 224 and 226 reverse their states in response to an Off signal from element 216. The result is the desired Off output of sum signal on lead 214.

It can thus be seen that in the embodiment of FIG. 8 there is a delay of only one between each stage of the computer; however, two carry signals must be provided between successive stages of the computer. In every other stage an input carry signal is indicated by an On input signal on one or both of two lines, while in the remaining stages an input no-carry signal is indicated by an On input signal on one or both of two lines.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a binary computer having a plurality of stages connected in cascade, carry propagation circuitry including means in each of said stages for producing a pair of carry output signals which are applied to the next successive stage as carry input signals, the carry output signals at every other stage of the computer being adapted to produce a carry input to the next successive stage when they are both of the same binary state, the carry output signals of the remaining stages in the computer being such that they will produce a carry input to the next suceeding stage when they are of opposite binary states, and single NOR elements interposed between the input and output carry signals for each stage.

2. A binary computer comprising a plurality of stages connected in cascade with each of said stages having an input signal A and an input signal B applied thereto, first means in each of said stages for producing an Off binary control signal whenever one or both of said input signals A and B are On, second means in each of said stages for producing an On binary control signal when both of the input signals A and B are On, a NOR circuit element in each of said stages having its input connected to the output of the corresponding NOR element in the preceding stage and its output connected to the input of the corresponding NOR element in the succeeding stage, means for applying one of said binary control signals in each stage to the input of the aforesaid NOR element for that stage, and means for applying the other of said binary control signals in each stage to the input of the NOR element in the succeeding stage, the arrangement being such that the two signals applied to the NOR element in each stage constitute carry input signals.

3. A binary computer comprising a plurality of stages connected in cascade with each of said stages having an input signal A and an input signal B applied thereto, first means in each of said stages for producing an Off binary control signal whenever one or both of said input signals A and B are On, second means in each of said stages for producing an On binary control signal when both of the input signals A and B are On, a NOR circuit element in each of said stages having its input connected to the output of the corresponding NOR element in the preceding stage and its output connected to the input of the corresponding NOR element in the succeeding stage, means for applying the binary control signal produced by said first means in every other stage of the computer to the input of the aforesaid NOR element for the stage, means for applying the binary control signal produced by said second means in said every other stage to the input of the NOR element in the succeeding stage, means for applying the binary control signal produced by said first means in the remaining stages to the input of the NOR element in the succeeding stage, and means for applying the binary control signal produced by said second means in the said remaining stages to the input of the aforesaid NOR elements for those stages, the arrangement being such that the two signals applied to the NOR element in each stage constitute carry input signals wherein a carry input is produced in every other stage when both of the input signals are Off whereas a carry input is produced in the remaining stages when one of the carry input signals is On.

References Cited in the file of this patent

Richards, Arithmetic Operations in Digital Computers, D. Van Nostrand, 1955, pages 89 to 93, 111 to 113.

Boswell, "NOR Logic," Instruments and Control Systems, September 1960, pages 1523 to 1525.